UNITED STATES PATENT OFFICE.

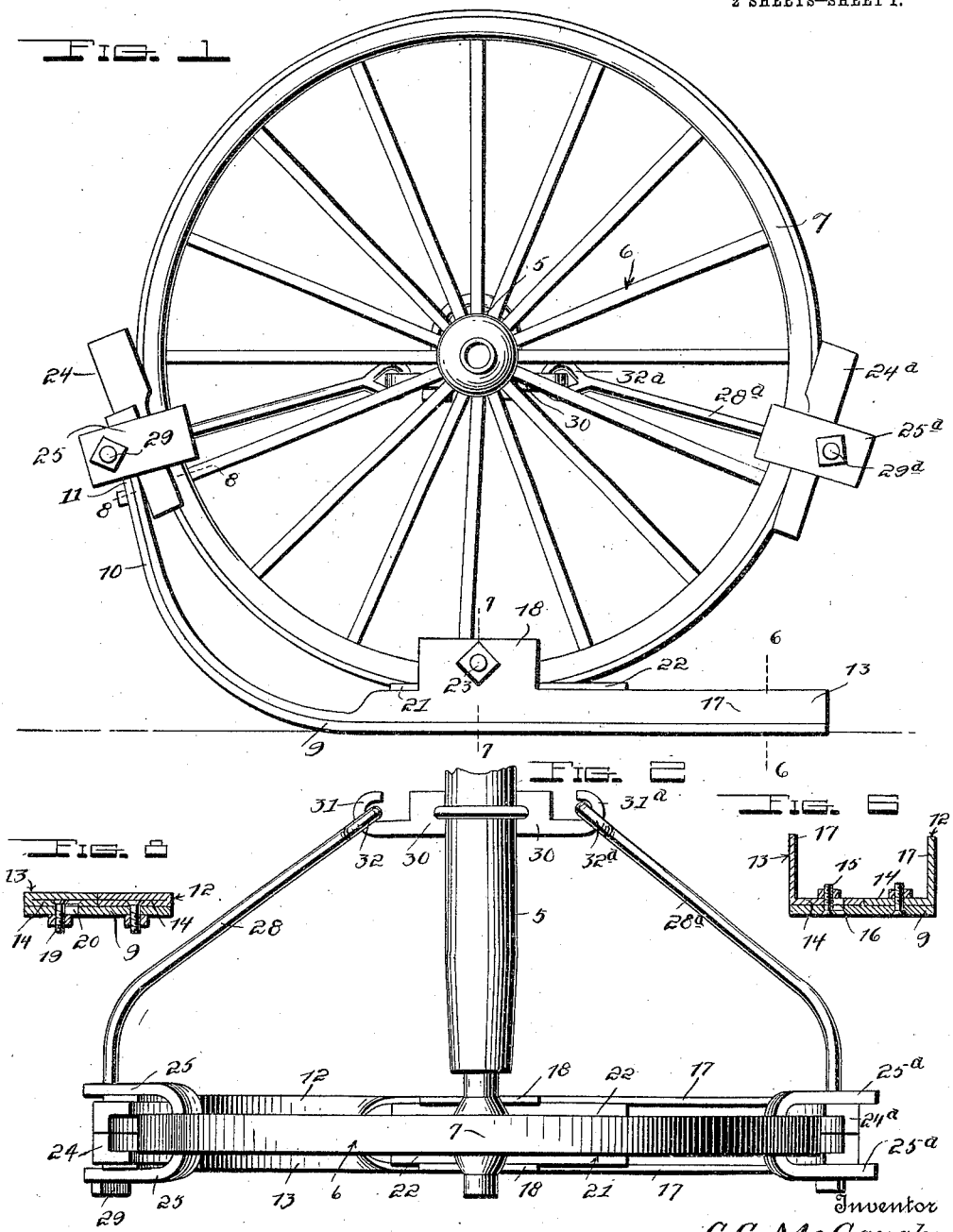

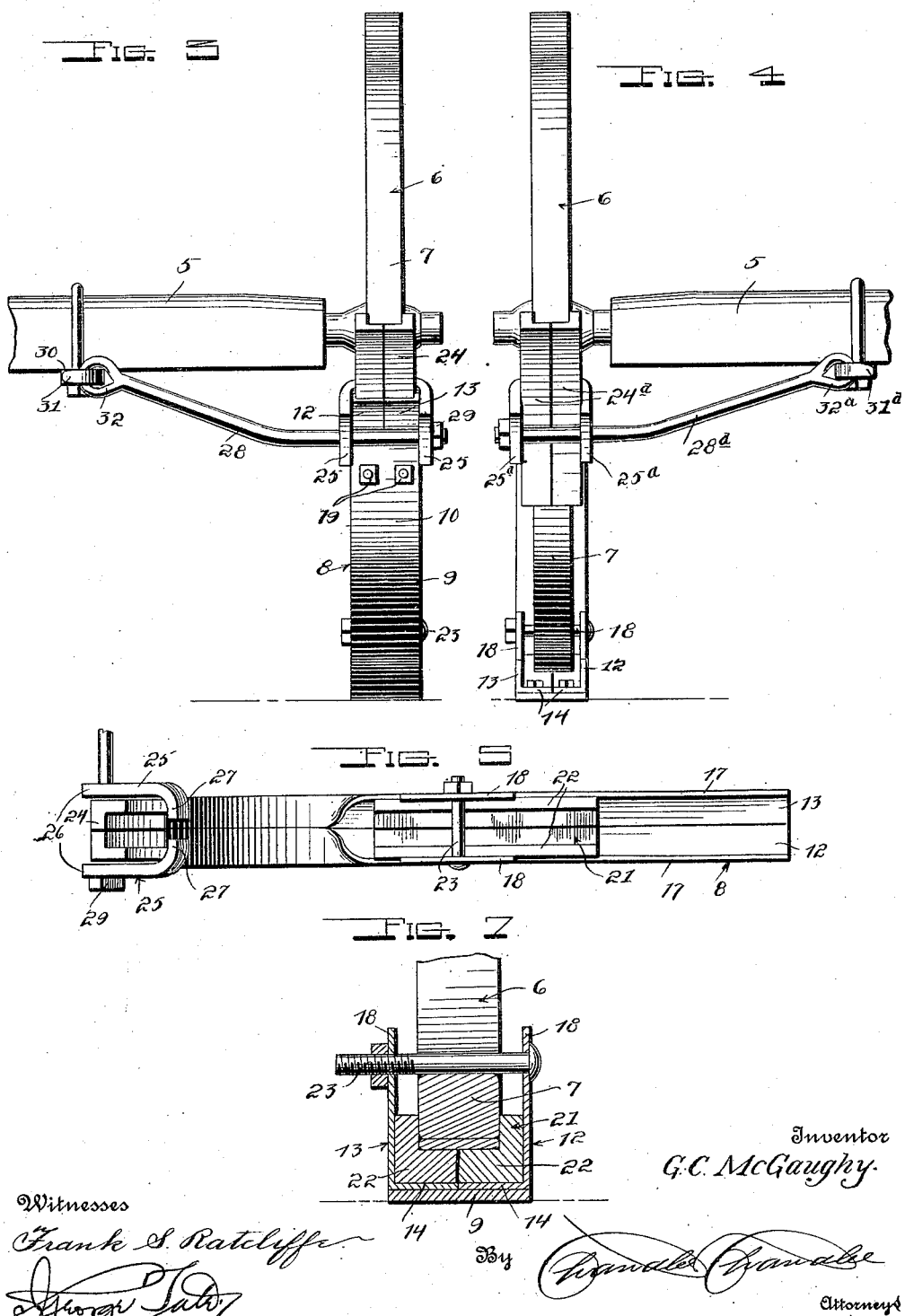

GEORGE C. McGAUGHY, OF CANADIAN, TEXAS.

SLEIGH-RUNNER.

1,078,936.

Specification of Letters Patent.  Patented Nov. 18, 1913.

Application filed May 14, 1912. Serial No. 697,216.

*To all whom it may concern:*

Be it known that I, GEORGE C. McGAUGHY, a citizen of the United States, residing at Canadian, in the county of Hemphill, State of Texas, have invented certain new and useful Improvements in Sleigh-Runners; and I do hereby declare the following to be a full, clear, and exact description of the invention, such as will enable others skilled in the art to which it appertains to make and use the same.

This invention relates to runner attachments for vehicle wheels, and has for its principal object to provide such an attachment which can be readily attached to or detached from a wheel.

Another object of the invention is to provide a runner attachment of the character described which is of such construction as to permit the same to be readily attached to wheels of different widths.

A further object of the invention is to provide a device for the purpose set forth which includes a novel means for firmly securing the wheel and the runner to the axle whereby said runner will be caused to swing in either direction with the axle.

A still further object of the invention is to provide a runner attachment of the character described which is composed of a minimum number of parts, and is therefore simple in construction and is cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

In the drawings: Figure 1 is a side elevation of a vehicle wheel showing the application of a runner constructed in accordance with my invention, Fig. 2 is a top plan view thereof, Fig. 3 is a front end elevation, Fig. 4 is a rear end elevation, Fig. 5 is a top plan view of the runner, Fig. 6 is a transverse sectional view taken on the line 6—6 of Fig. 1, Fig. 7 is a similar view taken on the line 7—7 of Fig. 1, and Fig. 8 is a similar view taken on the line 8—8 of Fig. 1.

Like reference numerals designate corresponding parts in all the figures of the drawings.

Referring to the drawings, 5 designates an axle which is supported at one end by a ground wheel 6, the latter including the usual rim 7.

My invention includes a runner which is indicated as a whole by the reference numeral 8. This runner includes a longitudinally disposed wear strip 9 which is preferably formed of steel, and has its forward end curved upwardly, as indicated by the reference numeral 10, and has its upper extremity curved forwardly, as at 11. Carried by the strip 9 is an opposed pair of attaching plates 12 and 13 respectively, the former being fixedly secured to one side of said strip by any suitable means. Each strip includes a base portion 14 which extends the entire length of the strip 9, the portion 14 of the plate 13 being secured to the strip 9 at its rear end by means of a bolt 15 which passes through a transverse slot 16 formed in said base portion 14. The rear ends of the base portions 14 are each formed with an outside flange 17 and a centrally disposed projection 18. The forward portions of the flanges 17 beyond the projections 18 are bent inwardly and are disposed in ground engagement with the base portions 14. The forward end of the attaching plate 13 is connected to the strip 9 by means of a bolt 19 which passes through a transverse slot 20 conjointly formed in the flange 17 and the base portion 14. It will thus be observed that by means of the slots 16 and 20, the attaching plate 13 may be shifted laterally to accommodate wheel tires of different widths.

Seated upon the base portions 14 of the attaching plates 12 and 13 intermediate the projections 18, is a rim-receiving block 21 which consists of a pair of longitudinally disposed sections 22—22. After the rim 7 has been positioned upon the block 21, a transverse bolt 23 is passed through suitable openings formed in the projections 18, the rim 7 being thus clamped between the block 21 and said bolt.

Disposed between the forward end 11 of the runner and the rim 7 is a grooved block 24 which is held in its proper position by means of a pair of opposed L-shaped clamps 25—25 which are disposed on opposite sides of the runner. Each clamp includes a body portion 26 and an inwardly extending foot 27, the latter engaging with the rim 7. The inner clamp 25 has threaded engagement with the threaded end of a bolt 28, the outer end of said bolt freely passing through an opening formed in the body portion of the outer clamp 25 and having a nut 29 associated therewith for drawing said clamp together and consequently tightly connecting the forward end of the runner to the rim and at the same time holding the block 24 in place.

Secured to the axle 5 in spaced relation to the wheel 6 is a transversely disposed attaching plate 30, said plate being secured to the axle by means of a U-bolt or other suitable fastening means. This plate is formed at its ends with inwardly extending hooks 31 and 31ᵃ respectively, the former having engagement with an eye 32 formed on the end of the bolt 28.

In order to better hold the wheel and consequently the runner to the axle so as to cause said runner to swing therewith, there is provided an opposed pair of clamps 25ᵃ—25ᵃ which are similar in construction to the clamps 25 previously described. Disposed between these clamps is a rim-engaging block 24ᵃ, and these clamps are secured to the rim by means of an auxiliary bolt 28ᵃ identical in construction with the bolt 28 previously described, said bolt 28ᵃ having an eye 32ᵃ formed on its inner end for engagement with the hook 31ᵃ of the attaching plate 30.

It will thus be observed that by this construction the attachment may be readily applied to any vehicle wheel now on the market regardless of the width of the tire, and also that this attachment may be readily removed whenever so desired. It will furthermore be observed that by means of this construction the runner is attached to the wheel and the wheel secured to the axle in such a manner that when said axle is turned laterally the runner will of necessity be caused to swing therewith.

What is claimed is:

The combination with a vehicle wheel and a runner, of a clamp for attaching the front end of the runner to said wheel comprising a pair of angle iron members positioned upon and forming a channel which receives the wheel rim, said angle irons bearing upon the wheel tire, a U-shaped member straddling the inner side of the wheel rim and having the legs projecting on the sides of and beyond said angle iron, and a bolt passed through the extremities of the legs of said U-shaped member outside of said runner and serving to clamp the runner to said angle irons, said bolt being bent abruptly on the inner side of said wheel and having terminal attaching means for engagement with the wheel axle.

In testimony whereof, I affix my signature, in presence of two witnesses.

GEORGE C. McGAUGHY.

Witnesses:
B. M. BAKER,
W. A. McGAUGHY.

---

Copies of this patent may be obtained for five cents each, by addressing the "Commissioner of Patents, Washington, D. C."